US006654068B1

United States Patent
Brewington et al.

(10) Patent No.: US 6,654,068 B1
(45) Date of Patent: Nov. 25, 2003

(54) BRAKE MECHANISM FOR CONTROLLING THE TILT OF A COMPUTER DISPLAY

(75) Inventors: James Gabriel Brewington, Raleigh, NC (US); David Campbell Brower, Wake Forest, NC (US); Richard Hunter Harris, Raleigh, NC (US); Herbert Gene Leonard, Louisburg, NC (US); Fred David Parnell, Raleigh, NC (US); Jeff David Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,755

(22) Filed: Jan. 4, 2000

(51) Int. Cl.[7] .......................... H04N 5/655; E04G 3/00; H05K 5/00
(52) U.S. Cl. .................... 348/827; 248/278.1; 361/681
(58) Field of Search ................................ 348/827, 830, 348/831, 836, 643, 826, 818; 248/285, 233, 289.1, 125.1, 278.1; 16/340, 297, 306, 342; 361/681, 699, 682; 345/207

(56) References Cited

U.S. PATENT DOCUMENTS

| 5,075,929 A | * | 12/1991 | Chung ........................ 16/342 |
| 5,077,551 A | * | 12/1991 | Saitou ........................ 345/207 |
| 5,165,509 A |   | 11/1992 | Kanno et al. ................. 192/44 |
| 5,173,837 A |   | 12/1992 | Blackwell et al. .......... 361/380 |
| 5,197,704 A |   | 3/1993 | Kitamura .................. 248/292.1 |
| 5,206,790 A |   | 4/1993 | Thomas et al. ............. 361/380 |
| 5,638,579 A |   | 6/1997 | Tenney ........................ 16/338 |
| 5,719,645 A |   | 2/1998 | Saito et al. ................. 348/818 |
| 5,771,152 A |   | 6/1998 | Crompton .................... 361/681 |
| 5,799,372 A |   | 9/1998 | Brunner et al. ............... 16/342 |
| 5,913,351 A |   | 6/1999 | Miura .......................... 16/340 |
| 5,924,665 A |   | 7/1999 | Sweere et al. ........... 248/285.1 |
| 5,992,809 A | * | 11/1999 | Sweere et al. ........... 248/278.1 |
| 6,189,842 B1 | * | 2/2001 | Bergeron Gull et al. . 248/125.1 |
| 6,276,655 B1 | * | 8/2001 | Byoun ........................ 361/679 |

* cited by examiner

Primary Examiner—Gims Philippe
(74) Attorney, Agent, or Firm—J. Bruce Schelkopf

(57) ABSTRACT

A computer display includes a pivotally mounted upper housing having a display screen, a brake used to retard pivoting motion of this upper housing, and a release mechanism for releasing the brake so that the upper housing can be freely moved. The display screen is preferably a touchscreen, which is touched to indicate a selection made by the user, with the brake resisting a tilting movement of the screen as it is touched. In a first version, two brakes are used to retard motion in both directions, with a single release wheel being turned in one direction to allow rearward motion of the upper housing and in another direction to allow forward motion of the upper housing. In a second version, a single brake is released by stopping motion of a release mandrel to unwrap a clutch spring. In a third version, two brakes, operating near opposite edges of the upper housing to stop downward movement of the upper housing, provide a particularly stiff mechanism for mounting the upper housing, and are simultaneously released by turning a knob to pivot a shaft.

32 Claims, 3 Drawing Sheets

BRAKE MECHANISM FOR CONTROLLING THE TILT OF A COMPUTER DISPLAY

BACKGROUND OF THE INVENTION

1. Field of the Invention

This invention relates to a means controlling the tilt of a display unit screen, and, more particularly, for releasably locking a screen of a touchscreen display unit at an adjustable tilt angle.

2. Description of the Related Art

In the patent art, a number of examples are found of mechanisms for controlling the tilt of a computer display through the use of one or more spring clutches or brakes arranged to resist a downward tilting movement of the display while releasing the display to be tilted upward. These mechanisms do not include means for releasing the clutch or brake to allow free downward tilting movement of the display; the clutches or brakes must be overpowered in order to tilt the display downward.

An example of such a mechanism is found in U.S. Pat. No. 5,771,152, which describes a tilt adjustment mechanism having an upper housing, a lower housing, and a shaft assembly. The shaft assembly receives gears which are pressed on either end of the shaft, which fits through locating slots in the lower housing. Each of the gears is activated by internal gears located on each side of the upper housing and integrally formed with the upper housing. The upper housing is hinged on the lower housing and can rotate 20 degrees. The shaft assembly mechanism provides a torsion bar function to insure that the upper housing moves evenly with respect to the lower housing. The shaft assembly mechanism decouples the frictional load in the two different rotational directions about its shaft, permitting adjustment of the forces to optimal levels in both directions. This mechanism includes a one-way clutch, in the form of a spring clutch or a bearing clutch, operating between the shaft and a bushing held within a clamp. When the upper housing is raised, the clutch releases to permit rotation of the shaft. When the upper housing is lowered, the clutch locks the shaft to the bushing, which then rotates within the clamp, with friction between the bushing and the clamp significantly increasing the force required to lower the upper housing.

Another example of such a mechanism is found in U.S. Pat. No. 5,206,790, which describes a laptop computer in which a display is connected to the lower housing by a pivot mechanism and a swivel mechanism. In the pivot mechanism, a pivot connects the display to a pivot plate, and a second pivot connects the pivot plate to the lower housing. The pivot consists of a pivot pin on each end of the pivot plate. The second pivot consists of split pivot pins at each end of the pivot plate. Each of the split pivot pins includes a pivot pin connected to the pivot plate and to an extension shaft having a sleeve portion extending over the end of the pivot pin and a shaft portion extending, and turning within a sleeve attached to the lower housing. A clutch spring extending over the sleeve and the sleeve portion of the extension shaft is arranged to unwind, releasing its connection between the sleeve and the extension shaft, as the display is opened, but to wind tighter, establishing a friction connection between the sleeve and the extension shaft, as the display is closed.

U.S. Pat. No. 5,197,704 also describes the use of spring clutches in a tilt adjusting mechanism for a display device. The angle adjusting device has a stationary bracket to be attached to a base and a rotating bracket to be attached to the display device. Each of these brackets is attached to a sleeve extending inward from the bracket. A shaft, having ends extending within the sleeves, also has an enlarged central portion extending between these sleeves. At each end of this enlarged central portion, a clutch spring extending over a part of the enlarged central portion and over the adjacent sleeve resists relative rotation between the shaft and the adjacent sleeve.

U.S. Pat. No. 5,173,837 describes the use of a clutch spring, through which a hinge pin for a laptop computer display extends, within a bracket in which the pin is pivotally mounted. The opposite ends of the clutch spring extend over a portion of the bracket to hold the spring in place. This arrangement produces approximately the same drag torque when the display is opened as when it is closed.

Other examples of the patent literature describe ways to provide friction at the pivot of a computer display through the use of friction braking without spring clutches. For example, U.S. Pat. No. 5,913,351 describes the use of friction plates held together on a pivot screw by means of a spring washer. U.S. Pat. No. 5,638,579 describes the use of a pair of bronze bearing blocks, one of which is responsive to precisely applied compressive force to produce user-controllable amounts of static and rotational friction to the tilt axis. U.S. Pat. No. 5,924,665 describes a multi-jointed and pivoted ceiling system for mounting a flat panel video display, employing elevational pivot assemblies including plastic friction washers and gas springs.

A problem common to these prior-art devices is that they fail to provide a release mechanism for disengaging the clutch or brake applying the friction torque. Thus, to move the display at least in one direction, a force sufficient to overcome the friction torque must be applied. In many applications, this friction torque must be substantial because it must be sufficient to hold the display in place when it is located so that gravity applies a maximum torque trying to lower the display. Having to overcome this friction torque makes it difficult to move the display and to position it precisely at a desired angle. As the display is manually moved against the friction torque, various parts within the display and within the mechanism through which it is mounted deflect elastically. When the torque moving the display is released, these elastic deflections are removed, so that the display does not remain where it has been positioned.

Thus, what is needed is a mechanism applying a drag torque to a computer display as it is tilted, with the mechanism including releasing means operable to cause the drag torque to be removed so that the display can be freely tilted in both directions.

BRIEF SUMMARY OF THE INVENTION

Accordingly, it is a first objective of the present invention to provide a braking mechanism, for restraining the tilting of a display housing, including a mechanism for releasing the braking mechanism to allow free movement of the display housing.

It is a second objective of the present invention to provide a braking mechanism which restrains the tilting of a display housing in both directions.

It is a third objective of the present invention to provide a braking mechanism, for restraining the tilting of a display housing, through which the display housing is rigidly held.

According to a first aspect of the present invention, there is provided a display unit including a base, an upper housing having a display screen, a pivot shaft, a first brake, and manually operated release means. The pivot shaft pivotally mounts the upper housing on the base. Pivoting the upper housing about the pivot shaft changes an angle of tilt of the display screen relative to the base. The first brake restrains pivoting of the upper housing in a first direction. The manually operated release means causes the first brake to release, allowing pivoting of the upper housing in the upper direction.

According to a second aspect of the present invention, there is provided apparatus for pivotally mounting an upper housing, including a display screen, on a base within a display unit. Pivoting the upper housing within the apparatus changes an angle of tilt of the display screen relative to the base. The apparatus includes first and second brakes. The first brake includes a first stator rigidly attached to a first end of the base and a first rotor rigidly attached to a first end of the upper housing, wherein the first rotor is pivotally mounted on the first stator, being restrained from rotation when the first brake is engaged, and being free to rotate when the first break is released. The second brake includes a second stator rigidly attached to a second end of the base, opposite the first end of the base, and a second rotor rigidly attached to a second end of the upper housing, opposite the first end of the upper housing, wherein the second rotor is pivotally mounted on the second stator, being restrained from rotation when the second brake is engaged, and being free to rotate when the second break is released, and wherein the first and second rotors are aligned along a common axis of rotation.

DETAILED DESCRIPTION OF THE INVENTION

Figure 1:
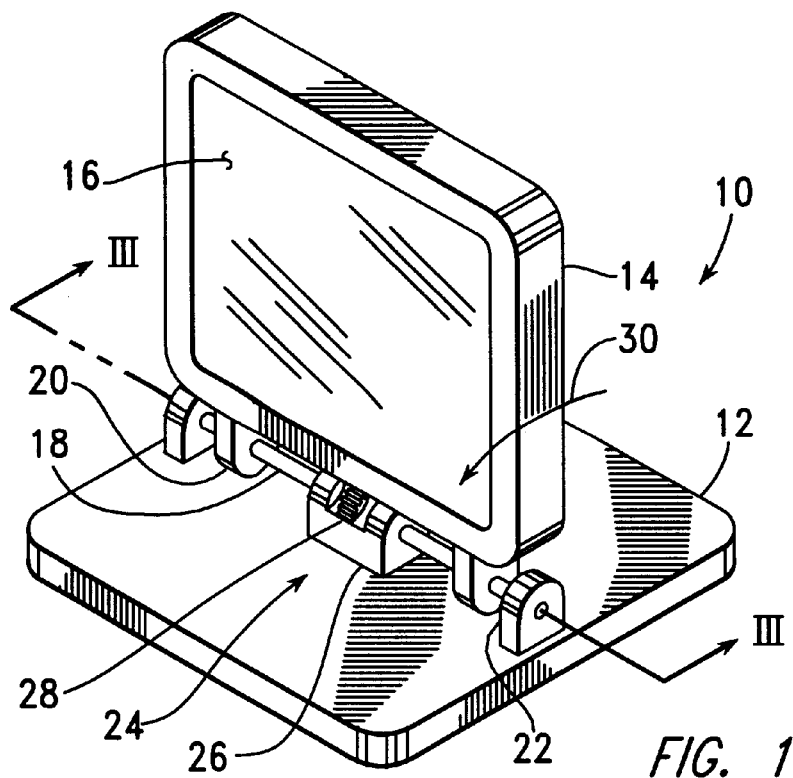
FIG. 1 is an isometric view of a computer display built in accordance with a first embodiment of the present invention.

FIG. 1 is an isometric view of a computer display 10 built in accordance with a first embodiment of the present invention. The display 10 includes a base 12 and an upper housing 14, in which a display screen 16 is mounted. The display screen 16 may be, for example, a liquid crystal display. The upper housing 14 is rigidly mounted to a pivot shaft 18 by means of a pair of mounting structures 20 extending downward from the upper housing 14. The pivot shaft 18 is in turn pivotally mounted within a pair of outer bearing structures 22 extending upward from the base 12. The shaft 18 is held in position by means of a brake mechanism 24, which is attached to the base 12, being held within a cover 26. The brake mechanism 24 holds the shaft 18 in position until a thumbwheel 28 is rotated in the direction of arrow 30. Thus, the upper housing 14 is held in the angular (tilt) orientation in which it is set until the thumbwheel 28 is manually rotated in the direction of arrow 30. (As described herein, an angle of tilt is the angle between the display screen of a display unit and a vertical plane. The upper housing of a display unit is tilted to change the angle of tilt.) When the thumbwheel 28 is rotated in the direction of arrow 30, the brake mechanism 24 releases the shaft 18 so that the upper housing 14 can be manually tilted opposite the direction of arrow 30. When the thumbwheel 28 is rotated opposite the direction of arrow 30, the brake mechanism 24 releases the shaft 18 so that the upper housing 14 can be manually tilted in the direction of arrow 30. When the upper housing 13 has been pivoted to the desired angle of tilt, the thumbwheel 28 is released to lock the upper housing 13 in place.

A preferred version of the display 10 is a touchscreen display in which the display screen 16 provides an indication of where it is touched, so that it can be touched to make a selection. Methods for providing such a capability are well known to those skilled in the art. In such an application, the brake mechanism is used to prevent movement of the upper housing 14 as the screen 16 is physically touched.

Figure 2:
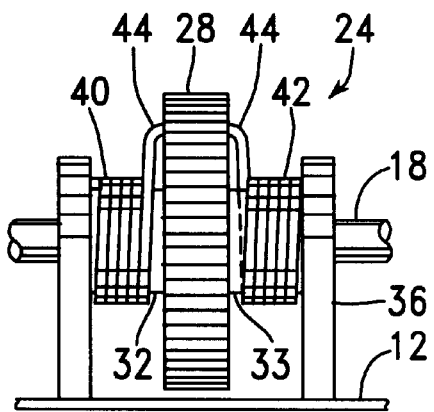
FIG. 2 is a front elevation of a brake mechanism within the computer display of FIG. 1 for releasably holding the display screen at a chosen angle of tilt.
Figure 3:
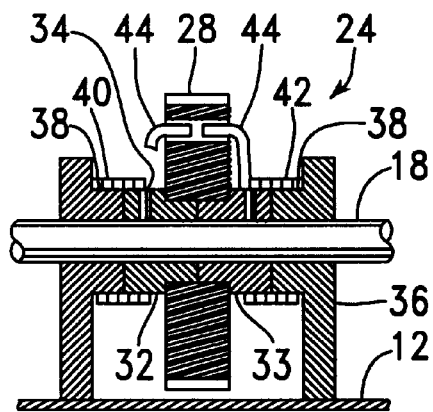
FIG. 3 is a longitudinal cross-sectional view of the brake mechanism of FIG. 2, taken as indicated by section lines III—III in FIG. 1.

FIGS. 2 and 3 show the brake mechanism 24 with the cover 26 removed. FIG. 2 is a front elevation, while FIG. 3 is a longitudinal cross-sectional view. A pair of pivoting mandrels 32, 33 are attached to this pivot shaft 18, by means of pins 34, where the shaft 18 extends through this mechanism 24. The shaft 18 is also pivotally mounted within a pair of inner bearing structures 36, each of which also includes an inward-extending hub forming a stationary mandrel 38. A clutch spring 40, 42 is wrapped around the pivoting mandrel 32, 33 and the stationary mandrel 38 on each side of the thumbwheel 28, with the two clutch springs 40, 42 being wound in the same direction. An inner end 44 of each clutch spring 46 extends into an aperture 46 within the thumbwheel 28.

When the thumbwheel 28 is released, the clutch springs 40,42 are wrapped tightly enough around the pivoting mandrels 32 and the stationary mandrels 38 to hold the shaft 18 in place. If an attempt is made to pivot the upper housing 14 in the forward direction of arrow 30 without manually rotating the thumbwheel 28, the friction torque generated between the first clutch spring 40 and the pivoting mandrel 32, around which it is wrapped, loosens the engagement between this clutch spring 40 and this pivoting mandrel 32 so that slipping could occur, while the friction torque generated between the second clutch spring 42 and the pivoting mandrel 33, around which it is wrapped, tightens the engagement between the second clutch spring 42 and the mandrels 33, 38 around which this clutch spring 42 is wrapped, so that slipping cannot occur. Similarly, if an attempt is made to pivot the upper housing 14 in the backward direction opposite the direction of arrow 30 without manually rotating the thumbwheel 28, the friction torque generated between the second clutch spring 42 and the pivoting mandrel 33 around which it is wrapped loosens the engagement between this clutch spring 42 and this pivoting mandrel 33 so that slipping could occur, while the friction torque generated between the clutch spring 40 and the pivoting mandrel 32 around which this clutch spring 40 is wrapped tightens the engagement between the first clutch spring 40 and the mandrels 32, 38 around which this clutch spring 40 is wrapped, so that slipping cannot occur. Thus, when the thumbwheel 28 is not manually rotated, the second clutch spring 42 prevents pivoting the upper housing 14 in the direction of arrow 30, while the clutch spring 40 prevents pivoting the upper housing 14 opposite the direction of arrow 30.

When the thumbwheel 28 is manually rotated opposite the direction of arrow 30, the movement imparted by the thumbwheel 28 to the inner extension 44 of the second clutch spring 42 causes this clutch spring 42 to begin to unwrap, disengaging from the pivoting mandrel 33 around which the second clutch spring 42 is wrapped, so that the upper housing 14 can be rotated in the direction of arrow 30. While this rotation of the thumbwheel 28 opposite the direction of arrow 30 also causes the first clutch spring 40 to tighten, by means of the movement imparted by the thumbwheel 28 to the inner extension 44 of the clutch spring 40, the upper housing 14 can still be rotated in the direction of arrow 30, since such rotation of the upper housing 14 causes the first clutch spring 40 to disengage by unwrapping. Since rotating the thumbwheel 28 opposite the direction of arrow 30 tightens the clutch spring 40, the upper housing is not released to pivot opposite the direction of arrow 30.

On the other hand, when the thumbwheel 28 is manually rotated in the direction of arrow 30, the movement imparted by the thumbwheel 28 to the inner extension 44 of the clutch spring 40 causes this clutch spring 40 to begin to unwrap, disengaging from the pivoting mandrel 32 around which the clutch spring 40 is wrapped, so that the upper housing 14 can be rotated opposite the direction of arrow 30. While this rotation of the thumbwheel 28 in the direction of arrow 30 also causes the second clutch spring 42 to tighten, by means of the movement imparted by the thumbwheel 28 to the inner extension 44 of the second clutch spring 42, the upper housing 14 can still be rotated opposite the direction of arrow 30, since such rotation of the housing 14 causes the second clutch spring 42 to disengage. Since rotating the thumbwheel 28 opposite the direction of arrow 30 tightens the second clutch spring 42, the upper housing is not released to pivot in the direction of arrow 30.

Thus, to pivot the upper housing 14 forward, in the direction of arrow 30, the thumbwheel 28 is pivoted opposite the direction of arrow 30, as the upper housing 14 is moved as desired. To pivot the upper housing 14 to the rear, opposite the direction of arrow 30, the thumbwheel 28 is pivoted in the direction of arrow 30 as the upper housing 14 is moved as desired. When the thumbwheel 28 is released, the upper housing 14 is locked in place.

This type of operation is particularly desirable to adjust the position of a display unit having a center of gravity nearly aligned, in a vertical direction, with the axis about which the display unit is pivoted, with the center of gravity being either above or below the pivot axis. In such a display unit, gravity cannot be relied upon to keep the display unit tilted at a desired angle against stop formed by a brake which restrains movement only in a single direction.

Figure 4:
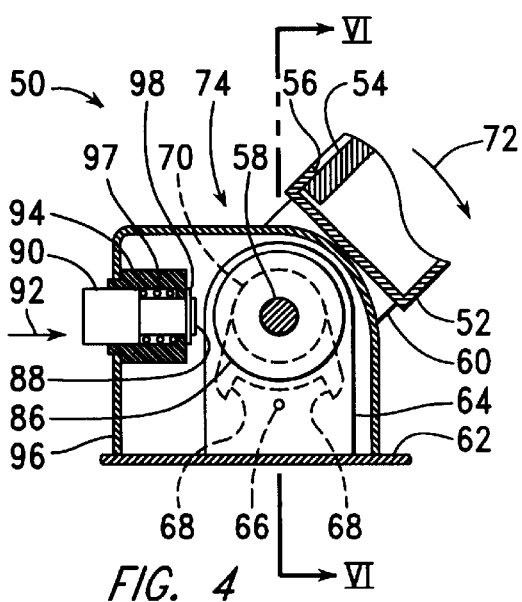
FIG. 4 is a fragmentary transverse cross-sectional view of a computer display built in accordance with a second embodiment of the present invention.

FIG. 4 is a fragmentary transverse cross-sectional view of a computer display 50 built in accordance with a second embodiment of the present invention. The computer display 50 includes an upper housing 52 having a display screen 54 visible through an aperture 56. The upper housing 52 is rigidly attached to a pivot shaft 58 by means of a pair of housing attachment structures 60 descending from the housing 52. The pivot shaft 58 is pivotally mounted on a base 62 by means of two or more upstanding bearing structures 64. A central bearing structure 64 also includes a pin 66, which limits the pivoting movement of shaft 58 by contacting stop surfaces 68 of a travel limiting plate 70. This limitation on pivoting motion is imposed so that the upper housing 52 is always in an orientation in which gravity provides a torque on the upper housing 52 in the direction of arrow 72. With this limitation, the upper housing 52 is held in place with a brake 74 preventing rotation in the downward direction of arrow 72 while allowing rotation opposite the direction of arrow 72.

A preferred version of the display 50 is a touchscreen display in which the display screen 54 provides an indication of where it is touched, so that it can be touched to make a selection. In such an application, touching the screen places a torque on the display screen in the downward direction of arrow 72, with the brake mechanism being used to prevent movement of the upper housing 52 as the screen 54 is physically touched.

Figure 5:
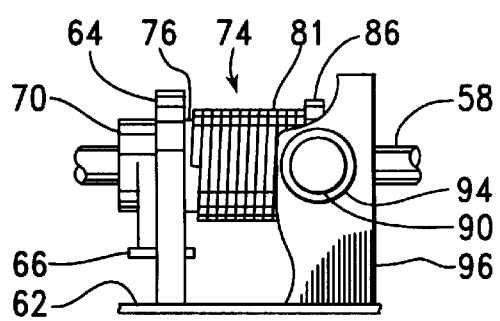
FIG. 5 is a front elevation of a brake mechanism within the computer display of FIG. 4.
Figure 6:
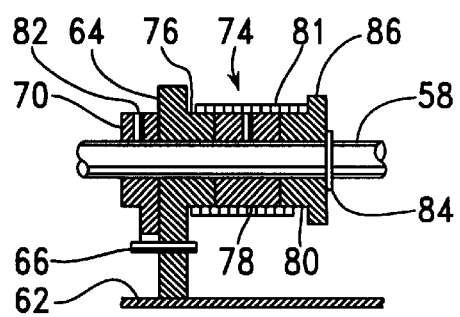
FIG. 6 is a longitudinal cross-sectional view of a brake mechanism within the computer display of FIG. 4, taken as indicated by section lines VI—VI in FIG. 4.

FIGS. 5 and 6 show the brake 74 used to hold the upper housing 52 at a preset angle within the computer display 50 of FIG. 4, with FIG. 5 being a front elevation of the brake 74, and with being a longitudinal cross-sectional view, taken as indicated by section lines VI—VI in FIG. 4. The brake 74 includes a stationary mandrel 76, a pivoting mandrel 78, a release mandrel 80, and a clutch spring 81. The stationary mandrel 76 is formed as a hub extending from the central bearing structure 64. The limiting plate 70 and the pivoting mandrel 78 are each fastened to the pivot shaft 58 by means of a pin 82. The release mandrel 80 is pivotally mounted on the pivot shaft 58, being held in place on the shaft 58 by means of a retaining clip 84. The clutch spring 81 is wound to extend over the three mandrels 76, 78, 80. The release mandrel 80 includes a ridge 86, which is contacted by an inner end 88 of a pushbutton 90 when the pushbutton 90 is depressed to the rear, in the direction of arrow 92. The pushbutton 90 slides within a button holder 94, extending within a cover 96. The pushbutton 90 is then returned opposite the direction of arrow 92 by a compression spring 97, to be held in place by a retaining clip 98. Thus, the pushbutton 90 is used as a brake to stop rotation of the release mandrel 80.

When a torque is applied to the upper housing 52 in the direction of arrow 72 with the release mandrel 80 being allowed to turn, friction between the pivoting mandrel 78 and the clutch spring 81 causes the clutch spring 81 to wind more tightly on the pivoting mandrel 78 and the stationary mandrel 76, so that movement of the upper housing 52 is restrained. On the other hand, when torque is applied to the upper housing in the direction of arrow 72 as the release mandrel 80 is held through the depression of pushbutton 90, the friction between the stationary mandrel 80 and the clutch spring 81, which begins to turn in the direction of arrow 72 with the pivoting mandrel 78, causes the clutch spring 81 to unwrap from the pivoting mandrel, releasing the brake 74 so that the upper housing 52 can be freely moved in the direction of arrow 72.

When a torque is applied to the upper housing 52 opposite the direction of arrow 72, friction between the pivoting mandrel 78 and the clutch spring 81 causes the clutch spring 81 to unwind on the pivoting mandrel 78 and the stationary mandrel 76. Thus, the upper housing 52 is raised, opposite the direction of arrow 72, without depressing the pushbutton 90. Because of the travel limitations imposed through the use of pin 62 and travel limiting plate. 70, gravity holds the upper housing downward, in the direction of arrow 72.

Figure 7:
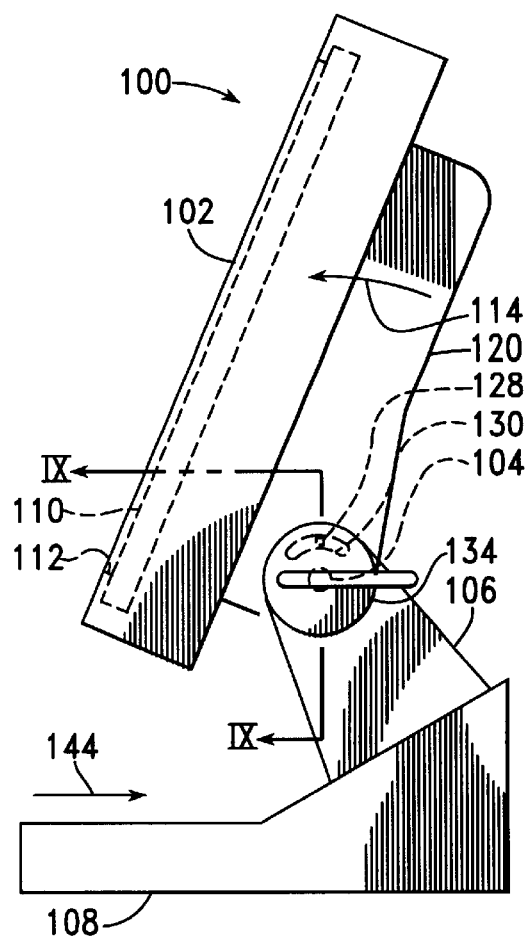
FIG. 7 is a right elevation of a computer display built in accordance with a third embodiment of the present invention.

FIG. 7 is a right elevation of display unit 100, built in accordance with a third embodiment of the present invention, which includes an upper housing 102, mounted to pivot about a shaft 104 extending between a pair of bearing brackets 106 extending upward as part of a base 108. The upper housing 102 includes a display screen 110 visible through an aperture 112. The display unit 100 is configured so gravity places a torque on the upper housing 102 in the direction of arrow 114 about the shaft 104.

Figure 8:
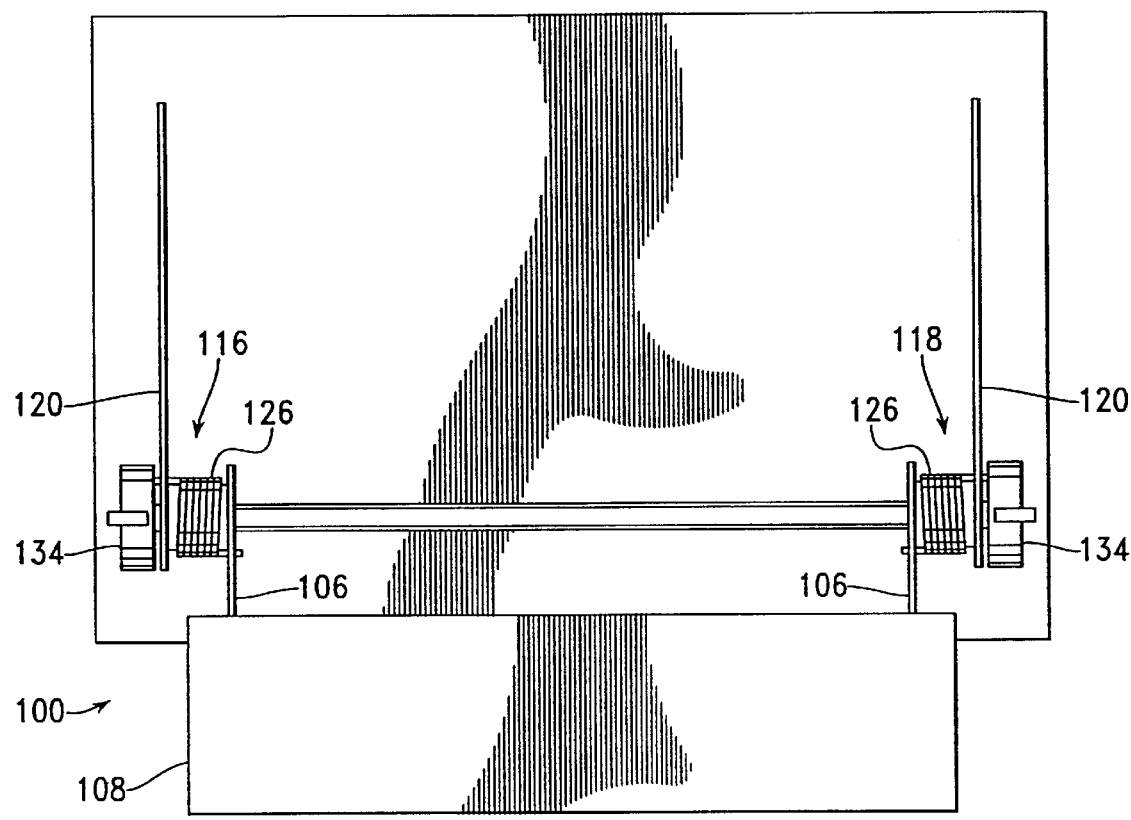
FIG. 8 is a rear elevation of the computer display in FIG. 7.

A preferred version of the display 100 is a touchscreen display in which the display screen 110 provides an indication of where it is touched, so that it can be touched to make a selection. In such an application, touching the screen places a torque on the display screen opposite the direction of arrow 114, with the brake mechanism being used to prevent movement of the upper housing 102 as the screen 110 is physically touched FIG. 8 is a rear elevation of the display unit 100, showing a first brake 116 and a second brake 118, which are used together to pivotally mount the upper housing 102 on the base 108 and to restrain a pivoting movement of the upper housing 102 in the direction of arrow 114. Each brake 116, 118 extends between a bearing bracket 106 forming part of the base 108 and support bracket 120 extending along the upper housing 102.

Figure 9:
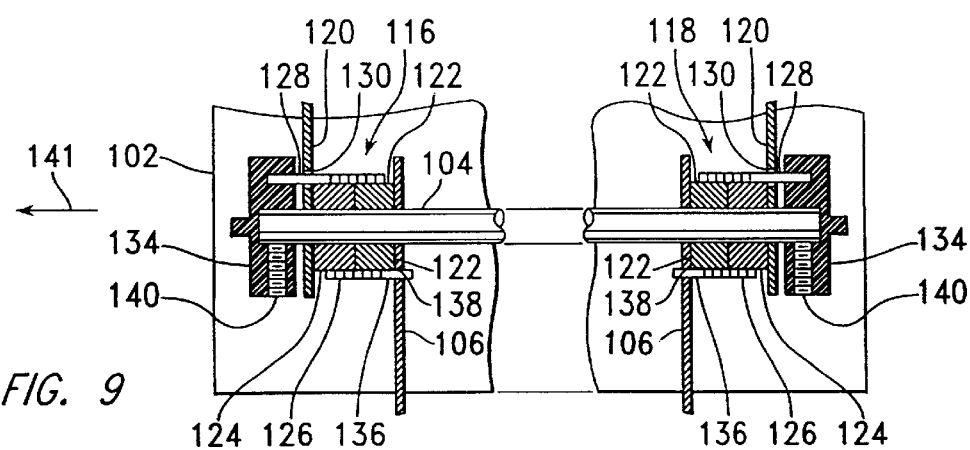
FIG. 9 is a fragmentary longitudinal cross-sectional view of a brake mechanism within the computer display of FIG. 7, taken as indicated by section lines XI—XI in FIG. 7.

FIG. 9 is a fragmentary longitudinal cross-sectional view of the display unit 100, taken as indicated by section lines IX—IX in FIG. 7, to show the structure of brakes 116, 118. Each brake 116, 118 includes a stationary mandrel 122 attached to an adjacent bearing bracket 106, a pivoting mandrel 124 attached to an adjacent support bracket 120, and a clutch spring 126 wound to extend along both of these mandrels 122, 124. Each clutch spring 126 includes a first end 128 extending through a slot 130 in the adjacent support bracket 120 into a hole within an adjacent release knob 134. Each clutch spring 126 also includes a second end 136 extending through a hole 138 in the adjacent bearing bracket 106. The shaft 104 is pivotally mounted within the mandrels 122, 124, being rotationally attached only to the first ends 128 of the clutch springs 126 through the release knobs 134, which are individually fastened to the shaft 104 by means of set screws 140.

Between the two brakes 116, 118, the relative positioning of the mandrels is reversed. That is, the pivoting mandrel 124 extends in the direction of arrow 141 from the stationary mandrel 122 in the first clutch 116, while, in the second clutch 118, the pivoting mandrel 124 extends from the stationary mandrel 122 in a direction opposite that of arrow 141. Also, the clutch springs 126 of the two brakes 116, 118 are wound in opposite directions. When these configurational changes are made together, the two brakes 116, 118 are made to operate in the same manner. Thus, as a torque is applied opposite the direction of arrow 114 to the upper housing 102 with the shaft 104 unrestrained, within each brake 116, 118, the frictional torque between the pivoting mandrel 124 and the clutch spring 126 causes this spring 116 to tighten on the pivoting mandrel 124 and on the stationary mandrel 122, so that movement of the upper housing 102 in the opposite direction of arrow 114 is resisted. On the other hand, when a torque is applied to the upper housing 102 in the direction of arrow 114, the housing 102 is easily raised, since, in each brake 116, 118, the frictional torque between the pivoting mandrel 124 and the clutch spring 126 causes this spring 126 to loosen by unwinding on the pivoting mandrel 124 and the stationary mandrel 122.

To tilt the upper housing 102 upward, opposite the direction of arrow 114, either of the knobs 134 is first pivoted in the direction of arrow 114, causing the end 128 of the clutch spring 126 to move within a slot 130 so that the clutch spring 126 is loosened from its engagement with the adjacent pivoting mandrel 124. The shaft 104 is thus used to transfer a pivoting motion between the two release knobs 134.

A significant advantage of the display unit 100 built in accordance with the third embodiment of the present invention over the prior art arises from the attachment of the pivoting mandrels 124 directly to the support brackets 120 of the upper housing, together with the attachment of the stationary mandrels 122 directly to the stationary brackets 106 of the base 108. The shaft 104 is not used to attach either pivoting mandrel 124 to a support bracket. This arrangement provides for a particularly rigid connection between the base 108 and the upper housing 102, eliminating bouncing conditions which can otherwise occur following the engagement of the brakes.

It is understood that, while the present invention has been described with some degree of particularity in the form of three specific embodiments, this description has been given only by way of example, and that numerous changes in the details and use, including the combination and arrangement of parts may be made without departing from the spirit and scope of the invention. In particular, various features of these embodiments may be combined to obtain configurations having valuable properties. For example, the clutch springs of the third embodiment, described above in reference to FIGS. 7–9, can be wound in the same direction, as described above in reference to FIGS. 1–3 to provide a display unit in which the brakes prevent tilting movement of the upper housing in both directions. The shaft would be pivoted in one direction to allow upward movement of the upper housing and in an opposite direction to allow downward movement of the upper housing. The use of the release mandrel of the second embodiment, described above in reference to FIGS. 4–6 can be applied to the other embodiments to replace unwrapping an end of a clutch spring.

What is claimed is:

1. A display unit comprising:

a base;

an upper housing including a display screen;

a pivot shaft pivotally mounting said upper housing on said base, wherein pivoting said upper housing about said pivot shaft changes an angle of tilt of said display screen relative to said base;

a first brake, restraining pivoting of said upper housing in a first direction; and manually operated release means, causing said first brake to release, allowing pivoting of said upper housing in said first direction.

2. The display unit of claim 1, wherein said display unit additionally comprises a second brake, restraining pivoting of said upper housing in a second direction, opposite said first direction, and said manually operated release means additionally causes said second brake to release, allowing pivoting of said upper housing in said second direction.

3. A display unit comprising:

a base;

an upper housing including a display screen;

a pivot shaft pivotally mounting said upper housing on said base, wherein pivoting said upper housing about said pivot shaft changes an angle of tilt of said display screen relative to said base;

a first brake, restraining pivoting of said upper housing in a first direction wherein said first brake includes a first pivoting mandrel turning with said upper housing, a first stationary mandrel attached to said base, and a first clutch spring wound over said first pivoting mandrel and said first stationary mandrel, and wherein frictional torque between said first pivoting mandrel and said first clutch spring causes said first clutch spring to wind as said upper housing is pivoted in said first direction and to unwind as said upper housing is pivoted in said second direction;

a second brake, restraining pivoting of said upper housing in a second direction, opposite said first direction; and manually operated release means, causing said first brake to release, allowing pivoting of said upper housing in said first direction, wherein said manually operated release means additionally causes said second brake to release, allowing pivoting of said upper housing in said second direction, wherein said manually operated release means includes a release member engaging a first end of said first clutch spring, and wherein moving said release member in a third direction causes said first clutch spring to unwind.

4. The display unit of claim 3, wherein said second brake includes a second pivoting mandrel turning with said upper housing, a second stationary mandrel attached to said base, and a second clutch spring wound over said second pivoting mandrel and said second stationary mandrel, frictional torque between said second pivoting mandrel and said second clutch spring causes said second clutch spring to wind as said upper housing is pivoted in said second direction and to unwind as said upper housing is pivoted in said first direction, said release member additionally engages a first end of said second clutch spring, and moving said release member in a fourth direction causes said second clutch spring to unwind.

5. The display unit of claim 4, wherein said first and second pivoting mandrels are mounted on said pivot shaft to turn with said pivot shaft, said release member comprises a wheel mounted to turn around said pivot shaft between and adjacent said first and second pivoting mandrels;

said first stationary mandrel extends along said pivot shaft adjacent said first pivoting mandrel, and said second stationary mandrel extends along said pivot shaft adjacent said second pivoting mandrel.

6. The display unit of claim 5, wherein said first and second clutch springs are wound in a common direction;

said first ends of said and second clutch springs are adjacent opposite sides of said release wheel, said first and fourth directions are common with one another, and said second and third directions are common with one another.

7. The display unit of claim 1, wherein said pivot shaft is rigidly mounted to said upper housing to turn with said upper housing.

8. A display unit comprising:

a base;

an upper housing including a display screen;

a pivot shaft pivotally mounting said upper housing on said base, wherein pivoting said upper housing about said pivot shaft chances an angle of tilt of said display screen relative to said base;

a first brake restraining pivoting of said upper housing in a first direction, wherein said first brake includes a pivoting mandrel turning with said upper housing, a stationary mandrel attached to said base, a release mandrel pivotally mounted on said pivot shaft, and a clutch spring wound over said pivoting mandrel, said stationary mandrel, and said release mandrel, wherein frictional torque between said pivoting mandrel and said clutch spring causes said clutch spring to wind as said upper housing is pivoted in said first direction with said release mandrel freely turning, to unwind as said upper housing is pivoted in a second direction, opposite said first direction, and to unwind as said upper housing is pivoted in said first direction with said release mandrel held stationary; and manually operated release means, causing said first brake to release, allowing pivoting of said upper housing in said first direction, wherein said manually operated release means includes a second brake holding said release mandrel stationary.

9. The display unit of claim 8, wherein said stationary mandrel and said release mandrel extend along said pivot shaft from opposite sides of said pivoting mandrel.

10. The display unit of claim 8, wherein said second brake includes:

a button with an interior end movable into contact with said release mandrel; and a spring holding said button so that said interior end is out of contact with said release mandrel.

11. A display unit comprising:

a base;

an upper housing including a display screen;

a pivot shaft pivotally mounting said upper housing on said base, wherein pivoting said upper housing about said pivot shaft changes an angle of tilt of said display screen relative to said base;

a first brake, restraining pivoting of said upper housing in a first direction;

manually operated release means, causing said first brake to release, allowing pivoting of said upper housing in said first direction; and a stop limiting pivoting of said upper housing about said pivot shaft to a range in which gravity acting on said upper housing produces a torque within said upper housing about said pivot shaft acting in said first direction.

12. The display unit of claim 1, wherein said display unit additionally comprises a second brake restraining pivoting of said upper housing, said pivot shaft is pivotally mounted on said base and on said upper housing, said first and second brakes are mounted at opposite ends of said upper housing, and said manually operated release means additionally causes said second brake to release, allowing pivoting of said upper housing.

13. A display unit comprising:

a base;

an upper housing including a display screen;

a pivot shaft Pivotally mounting said upper housing on said base, wherein pivoting said upper housing about said pivot shaft changes an angle of tilt of said display screen relative to said base, and wherein said pivot shaft is pivotally mounted on said base and on said upper housing;

a first brake, restraining pivoting of said upper housing in a first direction, wherein said first brake includes a first pivoting mandrel turning with said upper housing, a first stationary mandrel attached to said base, and a first clutch spring wound over said first pivoting mandrel and said first stationary mandrel, wherein frictional torque between said first pivoting mandrel and said first clutch spring causes said first clutch spring to wind as said upper housing is pivoted in said first direction and to unwind as said upper housing is pivoted in a second direction, opposite said first direction; and manually operated release means, causing said first brake to release, allowing pivoting of said upper housing in said first direction, wherein said manually operated release means additionally causes said second brake to release, allowing pivoting of said upper housing; and a second brake restraining pivoting of said upper housing, wherein said first and second brakes are mounted at opposite ends of said upper housing wherein said second brake includes a second pivoting mandrel turning with said upper housing, a second stationary mandrel attached to said base, and a second clutch spring wound over said second pivoting mandrel and said second stationary mandrel.

14. The display unit of claim 13, wherein frictional torque between said second pivoting mandrel and said second clutch spring causes said second clutch spring to wind as said upper housing is pivoted in said first direction and to unwind as said upper housing is pivoted in said second direction.

15. The display unit of claim 13, wherein
said manually operated release means includes said pivot shaft, and
said pivot shaft is connected to said a first end of said first clutch spring and to a first end of said second clutch spring.

16. The display unit of claim 14, wherein
said first pivoting mandrel extends in a third direction along said pivot shaft from said first stationary mandrel,
said second pivoting mandrel extends opposite said third direction along said pivot shaft from said second stationary mandrel, and
said first and second clutch springs are wound in opposite directions.

17. The display unit of claim 14, wherein
said manually operated release means includes said pivot shaft, and
said pivot shaft is connected to an end of said first clutch spring extending around said first pivoting mandrel and to an end of said second clutch spring extending around said second pivoting mandrel.

18. A display unit comprising:
a base;
an upper housing including a display screen, wherein said display screen provides a signal indicating a location at which a front surface of said display screen is physically touched;
a pivot shaft pivotally mounting said upper housing on said base, wherein pivoting said upper housing about said pivot shaft changes an angle of tilt of said display screen relative to said base, wherein pushing said front surface of said display screen places a torque on said upper housing in a first direction about said pivot shaft;
a first brake, restraining pivoting of said upper housing in said first direction; and manually operated release means, causing said first brake to release, allowing pivoting of said upper housing in said first direction.

19. Apparatus for pivotally mounting an upper housing including a display screen on a base within a display unit, wherein pivoting said upper housing within said apparatus changes an angle of tilt of said display screen relative to said base, and wherein said apparatus comprises:
a first brake, including a first stator rigidly attached to a first end of said base and a first rotor rigidly attached to a first end of said upper housing, wherein said first rotor is pivotally mounted on said first stator, being restrained from rotation when said first brake is engaged, and being free to rotate when said first break is released;
a second brake, including a second stator rigidly attached to a second end of said base, opposite said first end of said base, and a second rotor rigidly attached to a second end of said upper housing, opposite said first end of said upper housing, wherein said second rotor is pivotally mounted on said second stator, being restrained from rotation when said second brake is engaged, and being free to rotate when said second break is released, and wherein said first and second rotors are aligned along a common axis of rotation.

20. The apparatus of claim 19, additionally comprising manually operated release means for causing said first and second brakes to be released.

21. Apparatus for pivotally mounting an upper housing including a display screen on a base within a display unit, wherein pivoting said upper housing within said apparatus changes an angle of tilt of said display screen relative to said base, and wherein said apparatus comprises:
a first brake, including a first stator rigidly attached to a first end of said base and a first rotor rigidly attached to a first end of said upper housing, wherein said first rotor is pivotally mounted on said first stator, being restrained from rotation when said first brake is engaged, and being free to rotate when said first break is released, wherein said first brake includes a first pivoting mandrel rigidly attached to said upper housing and pivotally attached to said shaft, a first stationary mandrel rigidly attached to said base and pivotally attached to said shaft, and a first clutch spring wound over said first pivoting mandrel and said first stationary mandrel, with a first end of said first clutch spring attached to turn with said shaft;
a second brake, including a second stator rigidly attached to a second end of said base, opposite said first end of said base, and a second rotor rigidly attached to a second end of said upper housing, opposite said first end of said upper housing, wherein said second rotor is pivotally mounted on said second stator, being restrained from rotation when said second brake is engaged, and being free to rotate when said second break is released, wherein said first and second rotors are aligned along a common axis of rotation, and wherein said second brake includes a second pivoting mandrel rigidly attached to said upper housing and pivotally attached to said shaft, a second stationary mandrel rigidly attached to said base and pivotally attached to said shaft, and a second clutch spring wound over said first pivoting mandrel and said first stationary mandrel, with a first end of said second clutch spring attached to turn with said shaft; and
manually operated release means for causing said first and second brakes to be released, wherein said manually operated release means includes a shaft extending through said first and second brakes.

22. The apparatus of claim 21, wherein
said first pivoting mandrel extends in a third direction along said shaft from said first stationary mandrel, with said first end of said first clutch spring extending around said first pivoting mandrel,
said second pivoting mandrel extends opposite said third direction along said shaft from said second stationary mandrel, with said first end of said second clutch spring extending around said second pivoting mandrel, and
said first and second clutch springs are wound in opposite directions.

23. Apparatus for pivotally mounting an upper housing including a display screen on a base within a display unit, wherein pivoting said upper housing within said apparatus changes an angle of tilt of said display screen relative to said base, wherein said display screen provides a signal indicating a location at which a front surface of said display screen is physically touched, wherein pushing said front surface of said display screen places a torque on said upper housing, and wherein said apparatus comprises:
a first brake, including a first stator rigidly attached to a first end of said base and a first rotor rigidly attached to a first end of said upper housing, wherein said first rotor is pivotally mounted on said first stator, being restrained from rotation when said first brake is engaged, and being free to rotate when said first break is released; and
a second brake, including a second stator rigidly attached to a second end of said base, opposite said first end of said base, and a second rotor rigidly attached to a second end of said upper housing, opposite said first end of said upper housing, wherein said second rotor is pivotally mounted on said second stator, being restrained from rotation when said second brake is engaged, and being free to rotate when said second break is released, and wherein said first and second rotors are aligned along a common axis of rotation.

24. Apparatus for pivotally mounting an upper housing including a display screen on a base within a display unit, wherein said apparatus comprises:
a pivot shaft rigidly mounted to said upper housing and pivotally mounted to said base, wherein pivoting said pivot shaft changes an angle of tilt of said display screen relative to said base;
a first brake mounted on said base, wherein said first brake is engaged to resist pivoting said pivot shaft in a first direction and released to permit pivoting said pivot shaft in said first direction; and
a second brake mounted on said base, wherein said second brake is engaged to resist pivoting said pivot shaft in a second direction, opposite said first direction, and released to permit pivoting said pivot shaft in said second direction.

25. The apparatus of claim 24, additionally comprising manually operated release means for causing said first and second brakes to be simultaneously released.

26. Apparatus for pivotally mounting an upper housing including a display screen on a base within a display unit, wherein said apparatus comprises:
a pivot shaft rigidly mounted to said upper housing and pivotally mounted to said base, wherein pivoting said pivot shaft changes an angle of tilt of said display screen relative to said base;
a first brake mounted on said base, wherein said first brake is engaged to resist pivoting said pivot shaft in a first direction and released to permit pivoting said pivot shaft in said first direction, wherein said first brake includes a first pivoting mandrel turning with said pivot shaft, a first stationary mandrel attached to said base, and a first clutch spring wound over said first pivoting mandrel and said first stationary mandrel, and wherein frictional torque between said first pivoting mandrel and said first clutch spring causes said first clutch spring to wind as said upper housing is pivoted in said first direction and to unwind as said upper housing is pivoted in said second direction; and
a second brake mounted on said base, wherein said second brake is engaged to resist pivoting said pivot shaft in a second direction, opposite said first direction, and released to permit pivoting said pivot shaft in said second direction, wherein said second brake includes a second pivoting mandrel turning with said pivot shaft, a second stationary mandrel attached to said base, and a second clutch spring wound over said second pivoting mandrel and said second stationary mandrel and wherein frictional torque between said second pivoting mandrel and said second clutch spring causes said second clutch spring to wind as said upper housing is pivoted in said second direction and to unwind as said upper housing is pivoted in said first direction.

27. The apparatus of claim 26, wherein
said apparatus additionally comprises a release wheel pivotally mounted between said first and second pivoting mandrels,
said first and second pivoting mandrels extend between said first and second stationary mandrels,
said first and second clutch springs are wound in a common direction, and
said release wheel pivotally engages adjacent ends of said first and second clutch springs.

28. Apparatus for pivotally mounting an upper housing including a display screen on a base within a display unit, wherein said display screen provides a signal indicating a location at which a front surface of said display screen is physically touched, wherein pushing said front surface of said display screen places a torque on said upper housing in said first direction about said pivot shaft, and wherein said apparatus comprises:
a pivot shaft rigidly mounted to said upper housing and pivotally mounted to said base, wherein pivoting said pivot shaft changes an angle of tilt of said display screen relative to said base;
a first brake mounted on said base, wherein said first brake is engaged to resist pivoting said pivot shaft in a first direction and released to permit pivoting said pivot shaft in said first direction; and
a second brake mounted on said base, wherein said second brake is engaged to resist pivoting said pivot shaft in a second direction, opposite said first direction, and released to permit pivoting said pivot shaft in said second direction.

29. Apparatus for pivotally mounting an upper housing including a display screen on a base within a display unit, wherein said apparatus comprises:
a pivot shaft rigidly mounted to said upper housing and pivotally mounted to said base, wherein pivoting said pivot shaft changes an angle of tilt of said display screen relative to said base;
a first brake mounted on said base, wherein said first brake is engaged to resist pivoting said pivot shaft in a first direction and released to permit pivoting said pivot shaft in said first direction, and manually operated release means for releasing said brake.

30. Apparatus for pivotally mounting an upper housing including a display screen on a base within a display unit, wherein said apparatus comprises:

a pivot shaft rigidly mounted to said upper housing and pivotally mounted to said base, wherein pivoting said pivot shaft changes an angle of tilt of said display screen relative to said base;

a first brake mounted on said base, wherein said first brake is engaged to resist pivoting said pivot shaft in a first direction and released to permit pivoting said pivot shaft in said first direction, wherein said first brake includes a pivoting mandrel turning with said pivot shaft, a stationary mandrel attached to said base, and a clutch spring wound over said stationary mandrel and said pivoting mandrel to extend from said first pivoting mandrel, and wherein frictional torque between said pivoting mandrel and said clutch spring causes said clutch spring to wind as said upper housing is pivoted in said first direction with said release mandrel freely turning, to unwind as said upper housing is pivoted in a second direction, opposite said first direction, and to unwind as said upper housing is pivoted in said first direction with said release mandrel held stationary, and manually operated release means for releasing said brake, wherein said manually operated release means includes a release mandrel, pivotally mounted on said pivot shaft adjacent said pivoting mandrel and a second brake holding said release mandrel stationary.

31. The apparatus of claim 30, wherein said second brake includes:

a button with an interior end movable into contact with said release mandrel; and a spring holding said button so that said interior end is out of contact with said release mandrel.

32. The display unit of claim 29, wherein said display screen provides a signal indicating a location at which a front surface of said display screen is physically touched, and pushing said front surface of said display screen places a torque on said upper housing in said first direction about said pivot shaft.

* * * * *